Patented June 19, 1951

2,557,519

UNITED STATES PATENT OFFICE 2,557,519

PEST CONTROL COMPOSITIONS AND
PROCESS OF PRODUCING THEM

Davis A. Skinner, Compton, and Elvin L. Wampler, Anaheim, Calif., assignors to Union Oil Company of California, Los Angeles, Calif., a corporation of California No Drawing. Application February 18, 1949,
Serial No. 77,277

15 Claims. (Cl. 167—30)

This invention relates to pest control, and in particular concerns improved compositions for arresting or preventing the growth of insects and other organisms which are economically and physiologically undesirable. It further relates to certain new toxic agents which are employed as active agents in the pest control methods and compositions provided by the invention, as well as to methods for preparing such new toxic agents. The term "pest control" is employed herein as a generic expression including such terms as insecticide, fungicide, aphicide, larvicide, vermicide, ovicide, and the like.

The new toxic agents provided by the invention are certain specific mixtures of lower alkyl aryl sulfides having the general formula

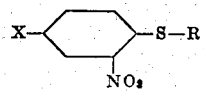

wherein R represents an alkyl group containing from 1 to 7 carbon atoms and X represents a substituent selected from the class consisting of nitro and halogen groups. The individual compounds of this type, e. g., ethyl 2,4-dinitrophenyl sulfide, isobutyl 2,4-dinitrophenyl sulfide, etc., are known, but we have found that certain mixtures of such compounds are superior to the separate components of such mixtures as insect toxicants. More particularly, we have found that the mixed products obtained by reaction between a 2,4-dinitro-halobenzene or a 2,5-dihalo-nitrobenzene and a mixture of lower alkyl mercaptans containing from 1 to 7 carbon atoms have insecticidal activities superior to those of the individual pure compounds comprising the mixed product. The invention accordingly comprises new composition of matter consisting of mixed lower alkyl 2,4-dinitrophenyl or 2-nitro-4-halophenyl sulfides and methods of preparing the same, as well as pest control compositions in which such mixed alkyl aryl sulfides are employed as the active toxic agents.

The mixed alkyl aryl sulfide toxic agents provided by the invention are prepared by reaction between a 2,4-dinitro-halobenzene or a 2,5-dihalo-nitrobenzene and a mixture of lower alkyl mercaptans such as is normally incident in natural or cracked petroleum distillates. While such mixtures of mercaptans may be prepared by mixing individual lower alkyl mercaptans in the proportion in which they occur in petroleum distillates, it is preferred to employ the mercaptan mixture obtained as a by-product in the so-called "Unisol" process of petroleum refining. Such process is described in detail in The Oil and Gas Journal, March 22, 1947, and consists in the removal of mercaptans from H2S-free light petroleum distillates of natural or cracked origin by extraction with a mixture of aqueous caustic soda and methanol. The extract phase, consisting of the caustic-methanol solution containing dissolved lower alkyl mercaptans, is stripped with steam whereby the mercaptans and the methanol are taken overhead and condensed. The condensed methanol-mercaptan mixture is then diluted with water, whereby the mercaptans separate out of solution as a supernatant oil which is drawn off and passed to storage. This oil is a dark-colored mobile liquid comprising mixed lower alkyl mercaptans and an appreciable amount of hydrocarbon material carried over from the extraction step. If desired, this mixture may be solvent extracted or distilled to separate the hydrocarbon components, but in the preparation of the toxic agents of the present invention it is preferred to employ the crude mixture as it is obtained from the "Unisol" process without further purification. A typical sample of such crude mixture contains from about 5 to about 15 per cent by weight of light hydrocarbons and has a mercaptan sulfur content of about 32 to 38 per cent by weight. It boils over the range of from about 70° F. to about 300° F. and has a specific gravity of about 35° to 40° API at 60° F. It has the following approximate composition:

| | Per cent by weight |
|---|---|
| Methyl mercaptan | 3–5 |
| Ethyl mercaptan | 12–16 |
| Propyl mercaptans | 30–40 |
| Butyl mercaptans | 20–30 |
| Amyl mercaptans | 5–10 |
| Higher mercaptans and hydrocarbons | 15–25 |

The reaction between mixed lower alkyl mercaptans, such as the mixture described above, and a 2,4-dinitro-halobenzene or a 2,5-dihalo-nitrobenzene to form the toxic agents provided by the invention is preferably carried out in the presence of an inert solvent, such as methanol or ethanol, employing the mercaptan reactant in the form of a solution in aqueous or alcoholic sodium hydroxide or other alkali-metal alkali. The alkaline mercaptan solution is conveniently prepared by dissolving the mercaptan mixture in a strong aqueous caustic soda solution and thereafter diluting the resulting solution with methanol or ethanol. The reaction is conveniently carried out simply by dissolving the nitro-aromatic reactant in the inert solvent, e. g., ethanol, and thereafter slowly adding the alkaline mercaptan solution with stirring. The reaction temperature is maintained below about 100° C., preferably at 20° to 80° C., and upon completion of the addition of the mercaptan solution the mixture is stirred and maintained at the reaction temperature for a short period of time to insure completion of the reaction. Upon completion of the reaction the alkyl aryl sulfide product is drawn off and washed several times with water. If desired, it may be further purified by vacuum distillation although such purification step is not necessary when the product is to be employed for pest control purposes.

In preparing the alkaline mercaptan solution employed in the reaction, it is preferable that the alkali-metal alkali be present in an amount somewhat in excess of that required by theory for the formation of alkali-metal mercaptides. Similarly, a molecular excess of the mixed mercaptans is employed with respect to the nitro-aromatic reactant. In calculating the quantities of the reactants, it may be assumed that the mercaptan mixture has a maximum average molecular weight of about 84. Thus, when employing sodium hydroxide in preparing the alkaline mercaptan solution, from 0.3 to 0.4 part by weight of sodium hydroxide are usually employed per part of the mercaptan mixture. Similarly, when employing 2,4-dinitro-chlorobenzene as the nitro-aromatic reactant, from about 1.8 to about 2 parts by weight of the 2,4-dinitro-chlorobenzene are usually employed per part of the mercaptan mixture. From about 3 to about 5 parts by weight of the inert diluent are usually employed per part of the nitro-aromatic reactant.

The following examples will illustrate typical preparations of the toxic agents provided by the invention, but are not to be construed as limiting the same. All proportions are given in parts by weight.

*Example I*

The mercaptan mixture employed was the mercaptan product obtained by the "Unisol" refining of a cracked gasoline having a boiling range of 106° to 316° F. It contained about 7.4 per cent by weight of neutral hydrocarbons, had a mercaptan sulfur content of about 37.7 per cent, a specific gravity of about 0.839 at 60/60° F., and distilled over the range of about 77° to 305° F. Approximately 181 parts of this product were dissolved in a caustic soda solution containing 64 parts of sodium hydroxide dissolved in 200 parts of water. Approximately 80 parts of ethanol were then added to the alkaline mercaptan solution, and the resulting mixture was added slowly with stirring to 324 parts of 2,4-dinitro-chlorobenzene dissolved in approximately 1000 parts of ethanol. The rate of addition of the mercaptan solution was adjusted so as to maintain a reaction temperature of about 52° to 55° C. During such addition, the alkyl aryl sulfide product separated out of solution as a supernatant oil. Upon completion of the reaction, the oil was separated from the aqueous layer and was washed several times with water. It was then dissolved in benzene and dried over anhydrous calcium sulfate. Finally, the benzene was distilled off whereby the mixed alkyl 2,4-dinitrophenyl sulfide product was obtained as a yellow oil which deposited yellow crystals upon cooling. This product has a density of about 1.28 at 21° C. and the following ultimate analysis:

| | Per cent by weight |
|---|---|
| Carbon | 47.49 |
| Hydrogen | 5.00 |
| Nitrogen | 10.20 |
| Sulfur | 14.68 |
| Chlorine | 0.28 |
| Oxygen (by difference) | 22.35 |

*Example II*

Approximately 51 parts of the mercaptan mixture employed in Example I were dissolved in a solution of 16 parts of sodium hydroxide in 200 parts of ethanol. This solution was added with stirring to 76.4 parts of 2,5-dichloro-nitrobenzene dissolved in approximately 475 parts of ethanol. During the addition of the mercaptan solution, the reaction temperature was maintained at about 35° C. The crude reaction product which separated out of solution during the addition of the mercaptan solution was drawn off, filtered several times with water. It was then dissolved in benzene and dried. Upon evaporation of the benzene, the mixed alkyl 2-nitro-4-chlorophenyl sulfide product was obtained as a dark red oil having a density of about 1.22 at 22° C. It had the following ultimate analysis:

| | Per cent by weight |
|---|---|
| Carbon | 47.24 |
| Hydrogen | 5.39 |
| Nitrogen | 4.87 |
| Sulfur | 15.99 |
| Chlorine | 17.49 |
| Oxygen (by difference) | 9.02 |

The mixed alkyl aryl sulfide products prepared as described above may be employed in various ways in the control of pest organisms. These products are high-boiling liquids or crystalline solids and are hence well suited for outdoor use in orchard or garden sprays or in dusting compositions since they do not readily evaporate. Spray compositions may take the form of a simple solution of the toxic agent in a non-phytotoxic solvent such as spray oil. More usually, however, such compositions are formulated as aqueous emulsions or suspensions which may contain a wide variety of emulsifying, wetting, or dispersing agents, sticking agents spreaders, diluents and secondary toxic agents in addition to the mixed alkyl aryl sulfide product. Any of the known procedures for preparing compositions may be employed, and any of the various known wetting agents, spreaders, etc. may be employed in their formulation. In accordance with usual practice, the compositions are conveniently prepared and marketed in concentrate form which can be admixed with water at any desired time to form the ultimate spray composition. Such a composition may comprise, for example, the toxic agent intimately admixed with 0.1 per cent by weight of the sodium salts of mixed sulfated higher alcohols. Upon mixing one part by weight of such composition with 99 parts by weight of water there is obtained an effective insecticidal spray of 1 per cent concentration. Such composition may also contain sticking agents, spreaders, and other commonly employed addition agents. Inasmuch as the toxic agent usually comprises a mixture of liquid and solid components, it is often convenient to employ the same in the form of a concentrated solution in an organic solvent, e. g. benzene or acetone, when preparing various insecticidal compositions.

The mixed alkyl aryl sulfide products may also be admixed with active or inert carriers, e. g., talc, starch, aluminum silicate, walnut shell flour, etc., to form insecticidal dusting compositions which may also contain other toxic agents such as sulfur, DDT, pyrethrins, nicotine derivatives, p-dichlorobenzene, etc. Similarly, they may be employed in cattle sprays and the like in conjunction with other toxic agents such as pyrethrins or rotenone, synergists, active or inert solvents, aerosols, etc.

The following examples will illustrate the formulation of a number of pest control compositions employing the herein described mixed alkyl aryl sulfide products as the primary toxic agent, but are not to be construed as limiting the invention.

Example III

| | Pounds |
|---|---|
| Mixed lower alkyl 2,4-dinitrophenyl sulfides | 3.75 |
| Attapulgus clay | 1.25 |
| Powdered aluminum silicate | 70.0 |

The toxic agent and clay are thoroughly mixed in a ball-mill, and the mixture is then blended into the powdered aluminum silicate.

Example IV

| | | |
|---|---|---|
| Mixed lower alkyl 2-nitro-4-chlorophenyl sulfides | pounds | 5 |
| Attapulgus clay | do | 10 |
| Powdered blood albumin | ounces | 4 |
| Water | gallons | 100 |

The toxic agent and clay are intimately mixed in a ball-mill and then added with thorough agitation to the water in which the blood albumin has previously been dispersed.

Example V

| | | |
|---|---|---|
| Mixed lower alkyl 2-nitro-4-chlorophenyl sulfides | pounds | 2.5 |
| Powdered blood albumin | ounces | 4 |
| Water | gallons | 100 |

The blood albumin is stirred into the water and the toxic agent then added with thorough agitation.

Example VI

| | | |
|---|---|---|
| Mixed lower alkyl 2,4-dinitrophenyl sulfides | pounds | 0.5 |
| Benzene | do | 1.0 |
| Powdered blood albumin | ounces | 4 |
| Water | gallons | 100 |

The toxic agent is dissolved in the benzene, and the resulting solution is stirred into the water in which the blood albumin has previously been dispersed.

Example VII

| | | |
|---|---|---|
| Mixed lower alkyl 2,4-dinitrophenyl sulfides | pounds | 1.0 |
| Petroleum naphtha | do | 20 |
| 5% aqueous spray oil emulsion | gallons | 100 |

The toxic agent is dissolved in the naphtha and then stirred into the aqueous oil emulsion.

Example VIII

| | | |
|---|---|---|
| Mixed lower alkyl 2,4-dinitrophenyl sulfides | pounds | 2.0 |
| Attapulgus clay | do | 2.5 |
| Kerosene | do | 1.0 |
| Commercial spreading agent ("Ortho" dry) | pounds | 0.5 |
| Water | gallons | 100 |

The toxic agent and clay are mixed by ball-milling, and the spreading agent is suspended in the kerosene. These two compositions are then stirred into the water.

Example IX

| | | |
|---|---|---|
| Mixed lower alkyl 2-nitro-4-bromophenyl sulfides | pounds | 1.0 |
| Talc | do | 1.0 |
| Cane sugar | do | 4.0 |
| Commercial spreading agent (Leffingwell "DO") | ounces | 4 |
| Commercial sticking agent (Leffingwell "DO") | pounds | 2 |
| Water | gallons | 100 |

The toxic agent and talc are thoroughly admixed, and then stirred into the water in which the cane sugar, spreading agent and sticking agent have previously been dispersed.

It will be understood that the compositions described above illustrate but a few of the various types of formulations which may be employed in preparing pest control compositions comprising the herein disclosed toxic agents. Other modes of employing the new toxic agents will be apparent to those skilled in the art.

The concentration in which the toxic agents of the invention are employed in pest control compositions varies widely depending upon a number of factors, including the particular toxic agent employed, the type of composition in which it is used, the type of pest organism being combatted, and the conditions under which the composition is to be employed. In general, however, when employed in aqueous emulsion or suspension form as an orchard or garden spray, it is preferable that the composition contain from about 0.1 to about 5.0 per cent by weight of the active agent. Such compositions usually also comprise a small amount, e. g. 0.001 to 0.5 per cent by weight, of a wetting or dispersing agent which serves to secure homogeneous dispersion of the toxic agent in the water or other liquid vehicle, and to promote good contact between the spray and the foliage or the like being treated. In other types of compositions, for example in dry dusting compositions wherein the toxic agent is admixed with an inert dry diluent, the active agent is usually employed in somewhat higher proportions, e. g., 5 to 25 or even 50 per cent by weight.

The toxic agents of the invention are effective against a variety of pest organisms. Dry dusting compositions comprising the same are effective against such pests as armyworm larvae (Cirphus unipuncta) and similar larval pests. Aqueous spray compositions are effective against such pests as greenhouse thrips (Heliothrips haemorrhoidalis), citrus thrips (Scirtothrips citri), citrus red mite (Paratetranychus citri), citrus red scale (Aonidiella aurantii), as well as against certain fungi, e. g. Sclerotina fructicola.

The following examples will illustrate the use of the toxic agents of the present class in the control of certain specific pest organisms, but are not to be construed as limiting the invention.

Example X

A mixture of lower alkyl 2,4-dinitrophenyl sulfides prepared from the mixed alkyl mercaptan product obtained from the "Unisol" refining of a cracked gasoline and 2,4-dinitro-chlorobenzene was tested along with certain of the individual lower alkyl 2,4-dinitrophenyl sulfides contained in such mixture for fungistatic action on the spores of *Sclerotina fructicola*. In carrying out the tests, the toxic agents were dispersed in a dilute sugar solution in concentrations twice those desired for the test. The dispersion was then mixed with an equal volume of a nutrient broth culture of the test organism spores. After 24 hours the culture was examined under the microscope and an actual count was made to determine the proportion of germinating spores. The results of these tests are tabulated as follows:

| Toxic Agent | Percentage of Spores Germinating at Concentrations of— | | | | | | |
|---|---|---|---|---|---|---|---|
| | 0.1 | 0.05 | 0.025 | 0.0125 | 0.01 | 0.005 | 0.0025 |
| Mixed lower alkyl 2,4-dinitrophenyl sulfides | ------- | ------- | 0 | 0 | 0 | 0 | 0 |
| n-Propyl 2,4-dinitrophenyl sulfide | 0 | 0 | 0 | ------- | 0 | ------- | 1–5 |
| iso-Propyl 2,4-dinitrophenyl sulfide | 0 | 0 | ------- | ------- | 1–5 | ------- | ------- |
| sec-Butyl 2,4-dinitrophenyl sulfide | ------- | ------- | 0 | ------- | 1–5 | ------- | 5–10 |
| iso-Butyl 2,4-dinitrophenyl sulfide | 0 | 0 | 0 | 0 | 0 | 0 | 10–25 |

It will be noted that the mixed lower alkyl 2,4-dinitrophenyl sulfide product is considerably more effective against the test organism than the individual compounds contained in the mixed product.

*Example XI*

Approximately 12 parts by weight of the mixed lower alkyl 2,4-dinitrophenyl sulfide product obtained in Example I was dispersed in 10,000 parts by weight of water with the aid of a small amount of powdered blood albumin. This composition was then sprayed on Valencia oranges infested with eggs of the citrus red mite (*Paratetranychus citri*). Examination of the fruit six days later showed 87 per cent of the eggs to be unhatched as compared with a control value of only about 8 per cent. Sec-butyl 2,4-dinitrophenyl sulfide when tested in a similar manner provided 80 per cent control at a concentration of 25 parts by weight per 10,000 parts of water.

*Example XII*

A mixed lower alkyl 2,4-dinitrophenyl sulfide product prepared as described in Example I was ball-milled with an equal weight of talc, and the resulting insecticidal dust was suspended in water with the aid of a small amount of "Multifilm" spreader and kerosene. The final composition contained 2.0 pounds of the active ingredient, 4 ounces of the spreader and one pint of kerosene per 100 gallons of water. This dispersion was applied to lemon trees infested with citrus red mite with a power sprayer. Thirty-five days after treatment, 10 leaves were picked from representative locations on each tree and were examined for live mites. It was found that each leaf bore an average of about 0.05 mite as compared with a control value of about 15.3.

*Example XIII*

A dusting type insecticide was prepared by mixing equal parts of mixed lower alkyl 2-nitro-4-chlorophenyl sulfide product prepared as described in Example II and an adsorbent clay. Sections of corn blade were thoroughly dusted with this composition and were then placed in petri dishes containing armyworm larvae (*Cirphus* [illegible]*uncta*). Twenty-four hours later, a larvae count showed a mortality of greater than 50 per cent as compared with a control mortality of less than 10 per cent.

*Example XIV*

Thirty-eight parts of a mixed lower alkyl 2,4-dinitrophenyl sulfide product prepared as described in Example I were dissolved in about 80 parts of benzene, and the resulting solution was dispersed in water with the aid of a small quantity of powdered blood albumin. The dispersion so obtained contained 1.5 pounds of the active agent per 100 gallons. Four ounces of a commercial spreading agent (Leffingwell "DO") and one quart of a commercial sticking agent (Leffingwell "DO") were then added, and the dispersion was applied to nine-tree plots of lemon trees infested with citrus thrips (*Scirtothrips citri*). Application was made with a three-nozzle boom power sprayer at the rate of about 3.85 gallons per tree. One week after spraying, 36 representative terminals in each plot were examined and the number of living thrips counted. It was found that an average of about 3.0 thrips per 36 terminals were present on the sprayed trees as compared with a control count of 180 thrips per 36 terminals.

Other modes of applying the principle of our invention may be employed instead of those explained, change being made as regards the methods or materials disclosed provided the steps or compositions stated by any of the following claims, or the equivalent of such stated steps or compositions, be employed.

We, therefore, particularly point out and distinctly claim as our invention:

1. A mixture of lower alkyl aryl sulfides prepared by reaction between an alkaline solution of a mixture of lower alkyl mercaptans and an aromatic compound selected from the class consisting of 2,4-dinitro-halobenzenes and 2,5-dihalo-nitrobenzenes, said mixture of lower alkyl mercaptans comprising alkyl mercaptans containing from 1 to 7 carbon atoms.

2. A mixture of lower alkyl aryl sulfides prepared by reaction between an alkaline solution of a mixture of lower alkyl mercaptans and an aromatic compound selected from the class consisting of 2,4-dinitro-chlorobenzene and 2,5-dichloro-nitrobenzene, said mixture of lower alkyl mercaptans comprising alkyl mercaptans containing from 1 to 7 carbon atoms in the proportions in which they are normally present in light petroleum distillates.

3. A mixture of lower alkyl 2,4-dinitrophenyl sulfides, the alkyl groups of which contain from 1 to 7 carbon atoms and are distributed in the proportion in which they normally occur as mercaptans in light petroleum distillates.

4. A mixture of lower alkyl 2-nitro-4-chlorophenyl sulfides, the alkyl groups of which contain from 1 to 7 carbon atoms and are distributed in the proportion in which they normally occur as mercaptans in light petroleum distillates.

5. The process which comprises reacting an alkaline solution of a mixture of lower alkyl mercaptans with a reactant selected from the class consisting of 2,4-dinitro-halobenzenes and 2,5-dihalo-nitrobenzenes and thereafter separating the mixed lower alkyl aryl sulfide product from the reaction mixture, said mixture of lower alkyl mercaptans comprising alkyl mercaptans containing from 1 to 7 carbon atoms in the proportion in which they normally occur in light petroleum distillates.

6. The process which comprises reacting 2,4-dinitro-chlorobenzene with an aqueous alkaline solution of a mixture of lower alkyl mercaptans containing from 1 to 7 carbon atoms obtained by extracting a light petroleum distillate with aqueous sodium hydroxide and methanol, and thereafter separating the mixed lower alkyl 2,4-dinitrophenyl sulfide product from the reaction mixture.

7. The process which comprises reacting 2,5-dichloro-nitrobenzene with an aqueous alkaline solution of a mixture of lower alkyl mercaptans containing from 1 to 7 carbon atoms obtained by extracting a light petroleum distillate with aqueous sodium hydroxide and methanol, and thereafter separating the mixed lower alkyl 2-nitro-4-chlorophenyl sulfide product from the reaction mixture.

8. The method which comprises dissolving in a molecular excess of aqueous sodium hydroxide a mixture of lower alkyl mercaptans containing from 1 to 7 carbon atoms obtained by extracting a cracked gasoline with aqueous sodium hydroxide and methanol, adding the resulting solution to a solution of 2,4-dinitro-chlorobenzene in an inert solvent while maintaining a reaction temperature below about 100° C., and recovering a mixture of lower alkyl 2,4-dinitrophenyl sulfides from the reaction mixture.

9. The method which comprises dissolving in a molecular excess of aqueous sodium hydroxide a mixture of lower alkyl mercaptans containing from 1 to 7 carbon atoms obtained by extracting a cracked gasoline with aqueous sodium hydroxide and methanol, adding the resulting solution to a solution of 2,5-dichloro-nitrobenzene in an inert solvent while maintaining a reaction temperature below about 100° C., and recovering a mixture of lower alkyl 2-nitro-4-chlorophenyl sulfides from the reaction mixture.

10. A pest control composition essentially comprising an aqueous dispersion of mixed lower alkyl 2,4-dinitrophenyl sulfides in which the alkyl groups contain from 1 to 7 carbon atoms.

11. A pest control composition essentially comprising an aqueous dispersion of mixed lower alkyl 2-nitro-4-chlorophenyl sulfides in which the alkyl groups contain from 1 to 7 carbon atoms.

12. A pest control composition essentially comprising a mixture of lower alkyl 2,4-dinitrophenyl sulfides in which the alkyl groups contain from 1 to 7 carbon atoms in admixture with a dry diluent material.

13. A pest control composition essentially comprising a mixture of lower alkyl 2-nitro-4-chlorophenyl sulfides in which the alkyl groups contain from 1 to 7 carbon atoms in admixture with a dry diluent material.

14. A pest control composition essentially comprising an aqueous dispersion comprising between about 0.1 and about 5.0 per cent by weight of a product selected from the class consisting of mixed lower alkyl 2,4-dinitrophenyl sulfides and mixed lower alkyl 2-nitro-4-halophenyl sulfides in which the alkyl groups contain from 1 to 7 carbon atoms.

15. A pest control composition essentially comprising between about 5 and about 50 per cent by weight of a product selected from the class consisting of mixed lower alkyl 2,4-dinitrophenyl sulfides and mixed lower alkyl 2-nitro-4-halophenyl sulfides in which the alkyl groups contain from 1 to 7 carbon atoms in admixture with a dry diluent material.

DAVIS A. SKINNER.
ELVIN L. WAMPLER.

REFERENCES CITED

The following references are of record in the file of this patent:

UNITED STATES PATENTS

| Number | Name | Date |
| --- | --- | --- |
| 2,213,214 | Hester | Sept. 3, 1940 |

OTHER REFERENCES

Bost et al.: J. A. C. S., vol. 54, pages 1985–7.
Hodgson et al.: J. Soc. Chem. Ind., vol. 46, Transactions, pages 435T–436T (1927).
Fink et al.: U. S. D. A. Bur. Ent. and Plant Quar. Bulletin E-425, March 1938, page 28.
Roark et al.: U. S. D. A. Bur. Ent. and Plant Quar. Bull. E-344 entitled "A List of Organic Sulphur Compounds," May 1935, page 18.